United States Patent Office 3,032,528
Patented May 1, 1962

3,032,528
SILICONE ELASTOMERS
Siegfried Nitzsche and Manfred Wick, Burghausen, Germany, assignors to Wacker-Chemie G.m.b.H., Munich, Bavaria, Germany
No Drawing. Filed Feb. 5, 1960, Ser. No. 6,870
Claims priority, application Germany Feb. 20, 1959
4 Claims. (Cl. 260—46.5)

This invention relates to silicone compositions capable of vulcanizing at room temperature to form elastomeric products.

Silicone rubber stocks based on siloxane polymers with fillers, vulcanizing agents, cross-linking agents, pigments, catalysts and other additives are well known, and commercially available. The recent development of room temperature vulcanizing (hereinafter "RTV") silicone rubber stocks has opened new areas of use for silicone rubber. Particularly useful are the RTV silicone rubber stocks capable of being packaged as single component stocks. The single component stocks do not require preliminary mixing and do not require immediate use after mixing.

Attempts to produce a single component RTV silicone rubber stock have met with some success. Such devices as absorption of cross-linking agent and catalyst in molecular sieves have been proposed (see U.S. patent application Serial No. 838,443, filed September 8, 1959). The cross-linking agent and catalyst are liberated from the molecular sieve at room temperature by replacement with water or polar solvent. Another suggested means for producing a one component RTV silicone rubber stock involves the use of siloxane polymers having acetoxy groups as polymer endblockers (see U.S. patent application Serial No. 799,432, filed March 16, 1959).

The one component RTV silicone rubber stocks heretofore introduced have not been entirely satisfactory because of limitation on the use of reinforcing silica or other reinforcing fillers and because of the release of acid inherent in the vulcanization and cure of the acetoxy endblockers. Thus the primary object of this invention is a new RTV silicone rubber stock. Another object is a one component RTV silicone rubber stock superior to the one component stocks heretofore known. Other objects and advantages achieved through this invention are disclosed in or will be apparent from the disclosure and claims following.

This invention provides a room temperature vulcanizing silicone rubber stock consisting essentially of (1) a linear siloxane polymer of the average molecular formula $R'R_2SiO[R_2SiO]_xSiR_2R'$ wherein each R is a monovalent hydrocarbon radical or a halogenated monovalent hydrocarbon radical, each R' is a hydrogen atom, alkoxy radical, aryloxy radical, hydroxy radical or acyloxy group and $x$ has an average value of from 50 to 10,000 and (2) an aminosilane of the formula $R''_nSi(NY_2)_{4-n}$ or an aminosilazane of the formula

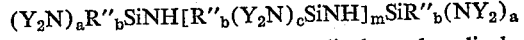

wherein each R'' is an alkyl radical, aryl radical, or aralkyl radical, each Y is a hydrogen atom, alkyl radical, aryl radical or aralkyl radical, $n$ is 0 or 1, $m$ is at least 1, $a$ is 2 or 3, $b$ is 0 or 1, and $c$ is 1 or 2.

The operable siloxanes (1) are linear polymers having reactive endblocking atoms or radicals. These polymers consist primarily of diorganosiloxane units of the formula $R_2SiO$ with up to 2 mol percent of $RSiO_{3/2}$ units. The radicals represented by R can be alkyl radicals such as methyl, ethyl and octadecyl, aryl radicals such as phenyl and anthracyl, alkaryl radicals such as tolyl and xylyl, aralkyl radicals such as benzyl and phenylethyl, cycloaliphatic radicals such as cyclopropyl and cyclobutyl and alkenyl radicals such as vinyl, allyl and octadecenyl and halogenated derivatives of such radicals such as chloromethyl, chlorofluoroethyl, 3,3,3-trifluoropropyl, bromophenyl, chlorobenzyl, chlorovinyl, and so forth. It is preferred that at least 75 percent of the radicals represented by R be methyl radicals.

The endblockers are hydrogen atoms, hydroxy radicals, alkoxy radicals, aryloxy radicals or acyloxy radicals, all of which are reactive in the system of this invention. The preferred endblockers because of ease of preparation, commercial availability and reactivity are the hydroxy radicals. Thus, hydroxy endblocked dimethyl-siloxane polymers are a preferred species for this invention.

The siloxane polymers employed herein can vary from relatively thin fluids averaging about 10 siloxane units per molecule to gums having up to about 10,000 siloxane units per molecule. It has been noted, however, that rubbers having good physical properties, cannot be obtained consistently with polymers of less than 50 units per molecule and the heavier gums are difficult to process.

The polymers can be homopolymers wherein all of the linear units are the same such as

where Me is methyl or OH endblocked copolymers of units such as PhMeSiO, $Me_2SiO$ and MeViSiO where Me is methyl, Ph is phenyl and Vi is vinyl. Mixtures of polymers and/or copolymers can also be employed.

The aminosilicon compositions employed herein can be aminosilanes and/or aminosilazanes. The aminosilanes are preferred because they are readily prepared, are less expensive, and exhibit reactivity superior to that of the silazanes. The aminosilanes operable herein contain 3 or 4 amino substituents per Si atom and 0 or 1 alkyl radical, aryl radical or aralkyl radical per Si atom. Thus tri- or tetrafunctional silanes are employed and the tetrafunctional silanes are more reactive hence will bring about a more rapid vulcanization than can be obtained with the trifunctional silanes. Furthermore, among the trifunctional silanes, alkyl substituted silanes are more reactive than aryl and aralkyl substituted silanes. In general, the operable aminosilanes are of the formulas $R''Si(NY_2)_3$ and $Si(NY_2)_4$, where R'' is an alkyl radical such as methyl, ethyl, propyl or octadecyl, an aryl radical such as phenyl or anthracyl or an aralkyl radical such as benzyl or phenylethyl and each Y is H, or an alkyl, aryl or aralkyl radical as defined for R''. Mixtures of the defined aminosilanes can be employed.

The operable aminosilanes are prepared by known methods. The preferred method of preparation involves reacting a silane containing hydrogen, a halogen or an alkoxy substituent with a primary or secondary amine. Suitable silane reactants include $SiCl_4$, $Si(OC_2H_5)_4$, $CH_3SiCl_3$, $CH_3Si(OC_3H_7)_3$, $C_6H_5Si(OCH_3)_3$, $C_6H_5SiCl_3$ and $C_6H_5SiH_3$. Suitable amine reactants include aliphatic, aromatic and araliphatic primary and secondary amines as well as ammonia. Operable amines include monobutyl amine, diethyl amine, aniline and methyl aniline.

The aminosilazanes operable herein are less active than the silanes hence are generally not as useful as the silanes.

These silazanes are prepared by known methods and are materials disclosed and described in the art.

The silicon rubber stocks are prepared by mixing thoroughly the siloxane polymer and aminosilane or silazane. Enough silane should be added to provide at least one mol of silane per mol of reactive endblocker present in the siloxane polymer. Thus the higher the molecular weight of the polymer, the smaller the amount of aminosilane required. Generally, the problem of obtaining adequate distribution of the silane through the polymer-silane mixture dictates the minimum quantity of silane be at least .05 part by weight per 100 parts polymer. It is seldom necessary to employ more than about 2 parts by weight of aminosilane per 100 parts by weight of siloxane polymer, but excess quantities of aminosilane can be tolerated.

The compositions of this invention can also contain pigments, flavorings and, if desired, essential oils in minor amounts (i.e. less than 1% by weight of the mixture). More commonly, fillers will be employed in the silicone rubber stocks of this invention. Basic fillers such as zinc carbonate, zincoxide, calcium oxide, calcium carbonate, magnesium oxide and magnesium carbonate can be employed and will often act as accelerators in securing a rapid vulcanization of the rubber in deep section. Further inert fillers such as diatomaceous earth, quartz flour and glass fibers, among others, can be used as well as reinforcing silicas such as fume silica and silica aerogels.

The silicone rubber stocks of this invention can be stored in essentially water and air tight tubes, cans or other containers and will remain workable and usable for months. The mixtures can be molded, extruded, shaped or otherwise worked for a short period of time and exposed to atmospheric moisture whereupon vulcanization and cure to an elastomeric product is accomplished. The rate of vulcanization is dependent upon the amount of atmospheric moisture present and under very low humidity conditions it may be necessary to add moisture to the surrounding air to obtain a practical rate of vulcanization. Other factors relating directly to rate of vulcanization include depth of layer, molecular weight of the polymer employed, functionality of the silane employed, and the nature of the organic substituents as well as the nature of the amino substituents in the silane. Deeper sections will vulcanize more slowly because the atmospheric moisture must penetrate into the polymer to effect the vulcanization. The greater the molecular weight of the polymer, the more rapid will be the vulcanization.

As discussed above, the tetraaminosilanes are more reactive and bring about a more rapid vulcanization than triaminosilanes, and the triaminoorganosilanes having a lower alkyl radical as the organic substituent are faster vulcanizing agents than those having higher alkyl, aryl or aralkyl substituents. Finally, the rate of vulcanization can be increased by employing silanes having primary aliphatic amines as contrasted to secondary aliphatic amines and primary or secondary aromatic amines.

The silicone rubber stocks of this invention can be used as sealing materials exhibiting stability to heat, cold and ozone, as joint sealants, as dented closures, as electrical insulation, as adhesives for silicone rubber, as silicone rubber coatings and as fabric and paper impregnating lacquers as well as for the many varied uses already proposed for RTV silicone rubber stocks.

The following examples are included herein to aid in understanding and employing this invention. The scope of the invention is fully delineated in the claims and is not limited by the examples. In the examples all parts and percentages are based on weight and all viscosities are measured at 25° C. unless otherwise specified. The symbols Me, Ph, Et, Bu and Vi represent respectively methyl, phenyl, ethyl, butyl and vinyl radicals.

*Example 1*

A mixture of 100 parts hydroxy endblocked dimethylsiloxane polymer of 10,500 cs. viscosity and 0.5 part $MeSi(NBu_2)_3$ were mixed on a mill. The mixture was poured into a glass cup in a layer 3 mm. deep. The mixture vulcanized within 4 hours at room temperature and at a relative humidity of 65 percent to form a silicone elastomer.

*Example 2*

A mixture of 100 parts ethoxy endblocked dimethylsiloxane polymer $[EtOMe_2SiO(Me_2SiO)_nSiMe_2OEt]$ having a viscosity of 23,400 cs. and 50 parts calcium carbonate and 0.4 part $PhSi(NHEt)_3$ was prepared on a mixing mill. The mixture was coated on a block of wood employing a spatula to form a film 3 mm. thick. An adherent coating of vulcanized silicone elastomer was produced after 4 hours at room temperature at a relative humidity of 65 percent.

*Example 3*

A mixture was prepared with 100 parts hydrogen endblocked dimethylsiloxane polymer of the average molecular formula $HMe_2SiO[Me_2SiO]_{700}SiMe_2H$, 100 parts quartz flour and 0.5 part $MeSi(NHBu)_3$. A dental cavity was filled with the mixture to a depth of 3 mm. The material vulcanized within 30 minutes to form an excellent closure for the cavity.

*Example 4*

When the mixture of Example 1 was reproduced employing in place of the hydroxy endblocked dimethylsiloxane polymer a hydroxy endblocked copolymer comprising 50 mol percent $Me_2SiO$ units and 50 mol percent $PhMeSiO$ units; 75 mol percent $Me_2SiO$ units, 24 mol percent $EtPhSiO$ units and 1 mol percent $MeViSiO$ units; or 90 mol percent $Me_2SiO$ units, 4.5 mol percent $Ph_2SiO$ units, 5 mol percent $Et_2SiO$ units and 0.5 mol percent $MeViSiO$ units, the resulting mixture was a satisfactory RTV silicone rubber stock.

*Example 5*

When Example 1 was repeated employing $Si(NBu_2)_4$, $Si(NHEt)_4$ or $Si(NHBu)_4$ as the aminosilane ingredient, the resulting mixtures were excellent RTV silicone rubber stocks.

*Example 6*

When Example 2 was repeated employing fume silica, zinc carbonate or diatomaceous earth as the filler in place of the calcium carbonate, the resulting mixture was a satisfactory RTV silicone rubber.

That which is claimed is:

1. A room temperature vulcanizing silicone rubber stock consisting essentially of a mixture of (1) 100 parts by weight of a siloxane polymer of the general formula $R'R_2SiO[R_2SiO]_xSiR_2R'$ wherein each R is selected from the group consisting of monovalent hydrocarbon radicals and halogenated monovalent hydrocarbon radicals, each R' is selected from the group consisting of hydroxyl radicals, hydrogen atoms, and alkoxy radicals, and x has an average value of from 50 to 10,000, and (2) .05 to 2.0 parts by weight of an aminosilicon composition selected from the group consisting of (a) aminosilanes of the formula $R''_nSi(NY_2)_{4-n}$ where each R'' is selected from the group consisting of alkyl radicals, aryl radicals, and aralkyl radicals, each Y is selected from the group consisting of hydrogen atoms, alkyl radicals, aryl radicals and aralkyl radicals and n has a value of 0 to 1 inclusive, and (b) aminosilazanes of the formula $$(Y_2N)_aR''_bSiNH[R''_b(Y_2N)_cSiNH]_mSiR''_b(NY_2)_a$$

wherein each R'' and each Y are as above defined, $a$ has a value of from 2 to 3 inclusive, $b$ has an average value of from 0 to 1 inclusive, $c$ has an average value of from 1 to 2 inclusive and $m$ is at least 1.

2. The rubber stocks of claim 1 wherein the siloxane polymer (1) is a hydroxy endblocked dimethylsiloxane and the aminosilicon composition (2) is an aminosilane.

3. The rubber stock of claim 2 wherein the amino silane is a tetraamino silane of the formula $Si(NY_2)_4$.

4. The rubber stock of claim 2 wherein the amino silane is a monoalkyltriamino silane of the formula $R''Si(NY_2)_3$ where $R''$ is alkyl and Y is as defined in claim 2.

References Cited in the file of this patent

UNITED STATES PATENTS 2,938,010    Bluestein _____ May 24, 1960

FOREIGN PATENTS 216,878    Australia _____ Feb. 7, 1957